United States Patent
Dhoot et al.

(10) Patent No.: US 12,099,953 B2
(45) Date of Patent: Sep. 24, 2024

(54) SUPPORT DEVICE DEPLOYMENT

(71) Applicant: INTERNATIONAL BUSINESS MACHINES CORPORATION, Armonk, NY (US)

(72) Inventors: Akash U. Dhoot, Pune (IN); Nitika Sharma, Zirakpur (IN); Sarbajit K. Rakshit, Kolkata (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 17/806,509

(22) Filed: Jun. 13, 2022

(65) Prior Publication Data
US 2023/0401507 A1    Dec. 14, 2023

(51) Int. Cl.
| | |
|---|---|
| *G06Q 10/00* | (2023.01) |
| *G06N 5/022* | (2023.01) |
| *G06Q 10/0633* | (2023.01) |
| *G06Q 10/0635* | (2023.01) |
| *G16Y 40/10* | (2020.01) |
| *G16Y 40/50* | (2020.01) |

(52) U.S. Cl.
CPC ......... *G06Q 10/0635* (2013.01); *G06N 5/022* (2013.01); *G06Q 10/0633* (2013.01); *G16Y 40/10* (2020.01); *G16Y 40/50* (2020.01)

(58) Field of Classification Search
None
See application file for complete search history.

(56) References Cited

U.S. PATENT DOCUMENTS

| | | | |
|---|---|---|---|
| 2018/0017972 A1 | 1/2018 | Chefalas | |
| 2018/0152563 A1* | 5/2018 | Mehta | H04W 80/04 |
| 2018/0247023 A1* | 8/2018 | Divine | G16H 20/40 |
| 2018/0326291 A1* | 11/2018 | Tran | G06Q 20/382 |
| 2019/0069154 A1* | 2/2019 | Booth | H04W 4/90 |

(Continued)

OTHER PUBLICATIONS

Krishnaswamy, Kavita, Assistive Robotics for Activities of Daily Living, May 9, 2020, Access Engineering, https://www.washington.edu/doit/programs/accessengineering/adept/adept-accessibility-briefs/assistive-robotics-activities-daily, p. 1-8. (Year: 2020).*

(Continued)

*Primary Examiner* — Joseph M Waesco
(74) *Attorney, Agent, or Firm* — Tihon Poltavets (57) ABSTRACT

A method providing a support device to assist personnel includes receiving data values from various devices associated with a task being performed by personnel, wherein the various devices include at least one Internet of Things (IoT) device and at least one wearable device. The method also includes comparing the received data values to historical data values associated with a pre-established knowledge corpus and identifying the task being performed by the personnel. In response to determining the received values exceed the historical values by a predetermined threshold for the task being performed by the personnel, the method includes determining whether the personnel require assistance with performing the task. In response to determining the personnel requires assistance with performing the task, the method includes instructing a support device to perform an action to assist the personnel with performing the task.

18 Claims, 6 Drawing Sheets

(56) References Cited

U.S. PATENT DOCUMENTS

| | | | |
|---|---|---|---|
| 2019/0088101 A1* | 3/2019 | Tunnell | G08B 21/02 |
| 2019/0105779 A1* | 4/2019 | Einav | B25J 9/1689 |
| 2019/0159009 A1* | 5/2019 | Barash | G08B 25/005 |
| 2020/0012670 A1* | 1/2020 | Heckmann | G06N 5/02 |
| 2020/0202281 A1* | 6/2020 | Barak | G06F 21/84 |
| 2020/0202471 A1* | 6/2020 | Barak | G06Q 10/063114 |
| 2020/0202472 A1* | 6/2020 | Barak | H04W 4/021 |
| 2020/0285977 A1* | 9/2020 | Brebner | H04L 67/02 |
| 2020/0310391 A1 | 10/2020 | Cole | |
| 2020/0334945 A1* | 10/2020 | Perea-Ochoa | G07F 17/3276 |
| 2021/0209540 A1* | 7/2021 | Bhide | H04L 51/222 |
| 2021/0314757 A1* | 10/2021 | Pellegrini | G06F 3/0482 |

OTHER PUBLICATIONS

Mell et al., "The NIST Definition of Cloud Computing", National Institute of Standards and Technology, Special Publication 800-145, Sep. 2011, pp. 1-7.

* cited by examiner

SUPPORT DEVICE DEPLOYMENT

BACKGROUND

This disclosure relates generally to hazardous condition monitoring, and in particular to providing a support device to assist personnel based on the hazardous condition monitoring.

An industrial setting typically includes various personnel utilizing various machinery and devices to perform physical tasks. In a manufacturing setting such physical tasks are repetitive and typically performed in a similar manner by specific personnel assigned to perform a specific task. However, instances can occur where physical tasks deviate from the norm due to unforeseen circumstances. Furthermore, in a warehouse setting such physical tasks are often nonrepetitive and typically not performed in a similar manner by specific personnel assigned to perform a specific task. The various machinery and devices within the industrial setting include numerous sensors for capturing data relating to physical tasks performed by the personnel.

SUMMARY

Embodiments in accordance with the present invention disclose a method, computer program product and computer system for providing a support device to assist personnel based on hazardous condition monitoring, the method, computer program product and computer system can receive data values from various devices associated with a task being performed by personnel, wherein the various devices include at least one Internet of Things (IoT) device and at least one wearable device. The method, computer program product and computer system can compare the received data values to historical data values associated with a pre-established knowledge corpus. The method, computer program product and computer system can identify, based on the comparing, the task being performed by the personnel. The method, computer program product and computer system can, responsive to determining the received values exceed the historical values by a predetermined threshold for the task being performed by the personnel, determine whether the personnel require assistance with performing the task. The method, computer program product and computer system can, responsive to determining the personnel requires assistance with performing the task, instruct a support device to perform an action to assist the personnel with performing the task.

DETAILED DESCRIPTION

Figure 1:
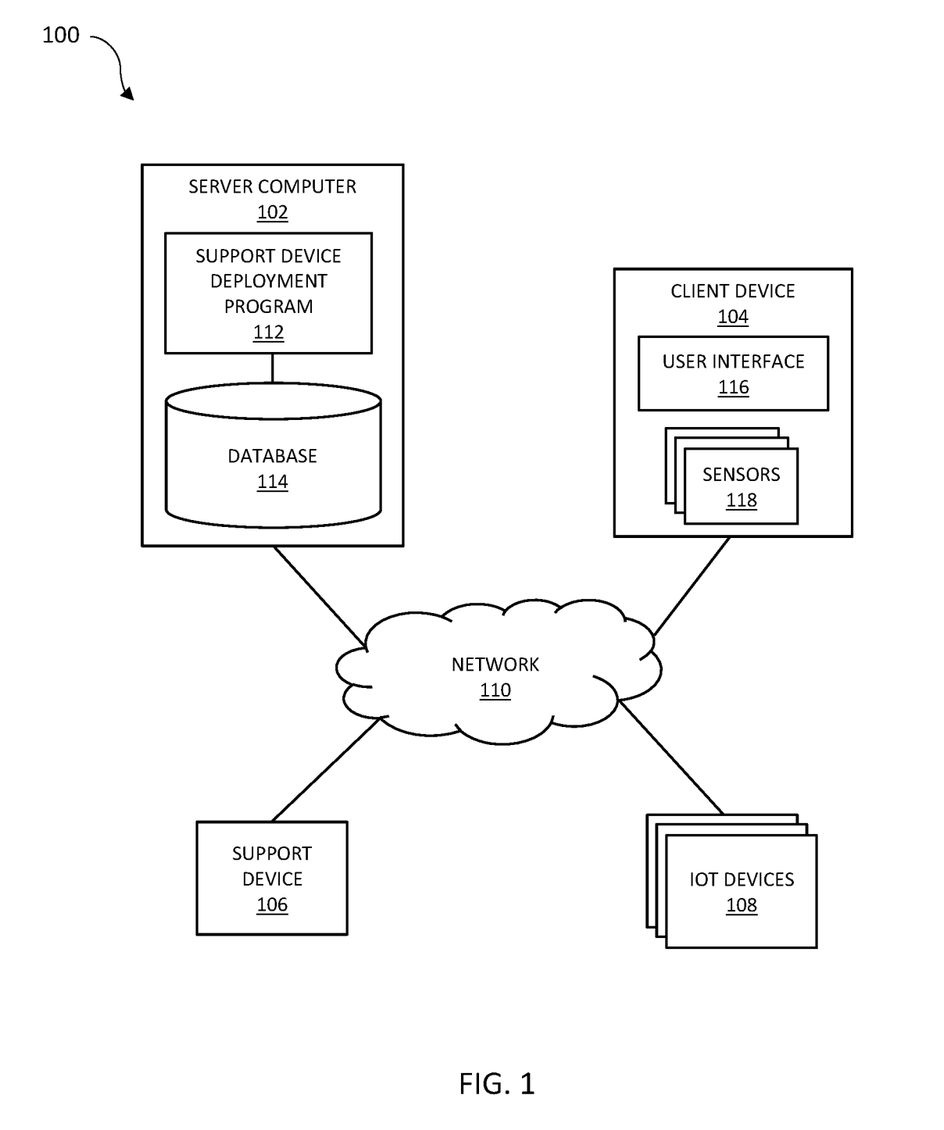
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102, client device 104, support device 106, and Internet of Things (IoT) devices 108 all interconnected over network 110. Server computer 102 can be a standalone computing device, a management server, a web server, a mobile computing device, or any programmable electronic device capable of communicating (i.e., sending and receiving data) with client device 104, support device 106, IoT devices 108, and other computing devices (not shown) within the distributed data processing environment via network 110. In other embodiments, server computer 102 can represent a server computing system utilizing multiple computers as a server system, such as in a cloud computing environment. In another embodiment, server computer 102 represents a computing system utilizing clustered computers and components (e.g., database server computers, application server computers, etc.) that act as a single pool of seamless resources when accessed within the distributed data processing environment. Server computer 102 includes support device deployment program 112 and database 114. Server computer 102 may include internal and external hardware components, as depicted and described in further detail with respect to FIG. 4.

Client device 104 can be a laptop computer, a tablet computer, a smart phone, smartwatch, a smart speaker, or any programmable electronic device capable of communicating (i.e., sending and receiving data) with server computer 102, support device 106, IoT devices 108 and other computing devices (not shown) within the distributed data processing environment via network 110. Client device 104 can be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown) within the distributed data processing environment via a network, such as network 110. In one embodiment, client device 104 represents one or more devices associated with a user. Client device 104 includes user interface 116 for interacting with support device deployment program 112, and sensors 118 for capturing biometric data associated with the user of client device 104. Sensors 118 collect various data for the user of client device 104, where support device deployment program 112 utilizes the data collected by sensors 118 to instructs support device 106 to perform an action to assist a user associated with client device 104 with a task. Sensors 118 can include an accelerometer, a gyroscope sensor, an orientation sensor, a pedometer, a heart rate sensor, and a blood pressure sensor.

Support device 106 can be an industrial automation device (industrial robot), an assistance systems integrated into client device 104, an assistance system integrated into any one of IoT device 108, or any programmable electronic device capable of assisting personnel with a task and capable of communication (i.e., sending and receiving data) with server computer 102, client device 104, IoT devices 108 and other computing devices (not shown) within the distributed data processing environment via network 110. Support device deployment program 112 instructs support device 106 to perform an action to assist personnel with a task.

IoT devices 108 represent one or more electronic devices connected to network 110 capable of communicating (i.e., sending and receiving data) with server computer 102, client device 104, support device 106, and other computing devices (not shown) within the distributed data processing environment via network 110. IoT devices 108 can include an instance of an intelligent virtual assistant (IVA) representing a software agent capable of performing various tasks for a user based on commands or questions provided by the user. IoT devices 108 can include but not limited to health monitoring devices, manufacturing equipment, warehouse equipment, wireless inventory trackers, and any other electronic device embedded with sensors and software for connecting and exchanging data with other devices and systems over the Internet (e.g., network 110).

Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server computer 102, client device 104, support device 106, IoT devices 108, and other computing devices (not shown) within the distributed data processing environment.

Support device deployment program 112 establishes a knowledge corpus for instances of hazardous conditions based on historical data for various personnel in a specific setting. Support device deployment program 112 receives historical data collected from client device 104 associated with a specific user (i.e., personnel) and IoT devices 108 for a task and identifies the task for the historical data collected. The task represents an activity performed by the user in the specific setting (e.g., warehouse floor, manufacturing floor) that includes data capturable by client device 104 (e.g., heart rate) and IoT devices 108 (e.g., camera feed for a movement by the user). Support device deployment program 112 identifies instances of required assistance based on the historical data, where the required assistance prevents a hazardous situation from occurring while performing the task. Support device deployment program 112 identifies instances of hazardous conditions based on the historical data, where the hazardous condition represents a danger to the user while performing the task. Support device deployment program 112 generates a knowledge corpus for the historical data, client device 104 and IoT devices 108, and the task being performed by the user.

Support device deployment program 112 provides support device 106 to assist personnel based on hazardous condition monitoring by receiving data from client device 104 and IoT devices 108 associated with a task being performed by a user. Support device deployment program 112 compares the received data to historical data from the previously established knowledge corpus and identifies the task being performed by the user based on the comparison. Support device deployment program 112 determines whether the received values exceed historical values. In the event support device deployment program 112 determines the received values do not exceed historical values, support device deployment program 112 determines whether the user is still actively performing the task. In the event support device deployment program 112 determines the received values do exceed historical values, support device deployment program 112 determines whether assistance is required by support device 106. In the event support device deployment program 112 determines assistance is not required by support device 106, support device deployment program 112 notifies the user regarding a deviation in the received values and the historical values and determines whether the user is still actively performing the task. In the event support device deployment program 112 determines assistance is required by support device 106, support device deployment program 112 determines whether a hazard condition is present. In the event support device deployment program 112 determines a hazard condition is not present, support device deployment program 112 notifies the user regarding a deviation in the received values and the historical values and determines whether the user is still actively performing the task. In the event support device deployment program 112 determines a hazard condition is present, support device deployment program 112 identifies an action performable by support device 106 to correct the value deviation.

Support device deployment program 112 identifies a specific support device 106 to perform the action to assist the user with the task and instructs the specific support device 106 to perform the action to assist the user with the task. Support device deployment program 112 determines whether updated values from client device 104 and IoT device 108 exceed historical values. In the event support device deployment program 112 determines the updated values from client device 104 and IoT devices 108 exceed historical values, support device deployment program 112 reverts to instruct support device 106 to perform the action to assist the user with the task. In the event support device deployment program 112 determines the updated values from client device 104 and IoT device 108 do not exceed historical values, support device deployment program 112 updates the historical model (i.e., the knowledge corpus) for future iterations by inputting the received data values and the updated data values into the model. Support device deployment program 112 determines whether the user is still actively performing the task. In the event support device deployment program 112 determines the user is still actively performing the task, support device deployment program 112 reverts to receiving data from client device 104 and IoT devices 108 associated with the task being performed by the user. In the event support device deployment program 112 determines the user is no longer actively performing the task, support device deployment program 112 ceases operations.

Database 114 is a repository that stores various data including operational data from sensors 118 from client device 104, operational data for support device 106, and operational data for each of IoT devices 108, and any other data pertinent to support device deployment program 112 for providing support device 106 to assist personnel (i.e., user of client device 104) based on hazardous condition monitoring. In the depicted embodiment, database 114 resides on server computer 102. In another embodiment, database 114 may reside on client device 104 or elsewhere within the distributed data processing environment provided support device deployment program 112 has access to database 114. A database is an organized collection of data, where database 114 can be implemented with any type of storage device capable of storing data that can be accessed and utilized by support device deployment program 112, such as a database server, a hard disk drive, or a flash memory.

User interface 116 enables a user to make requests of or issue commands to server computer 102, client device 104, support device 106, and IoT device 108 via network 110. User interface 116 also enables the user to receive information and instructions in response on client device 104 via network 110. In one embodiment, a user of client device 104 accesses user interface 116 via voice commands in natural language. In one embodiment, user interface 116 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 116 enables a user of client device 104 to interact with an instance of support device deployment program 112 operating on server computer 102.

Figure 2:
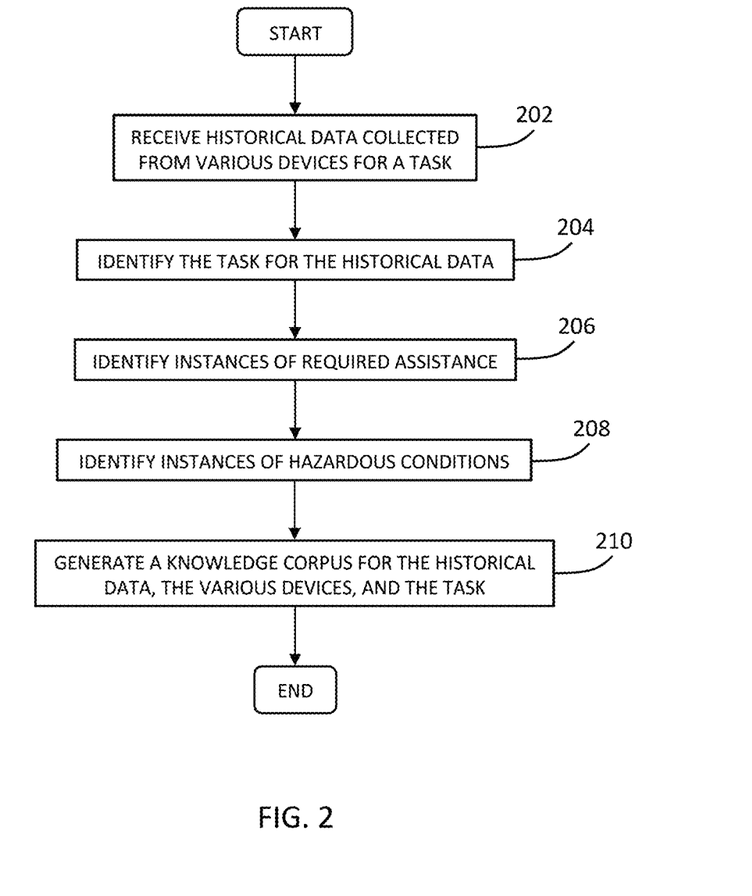
FIG. 2 depicts a flowchart for a support device deployment program establishing a knowledge corpus based on historical data associated with various devices for physical tasks performable by personnel, in accordance with an embodiment of the present invention.

FIG. 2 depicts a flowchart for a support device deployment program establishing a knowledge corpus based on historical data associated with various devices for physical tasks performable by personnel, in accordance with an embodiment of the present invention.

Support device deployment program 112 receives historical data collected from various devices for a task (202). Support device deployment program 112 allows for a user to set privacy restrictions and select a level of access to various IoT devices, support devices, and client devices (e.g., wearable device) associated with the user. The level of access defines an amount of data that support device deployment program 112 receives from the various IoT devices, support devices, and client devices. Support device deployment program 112 ensures that privacy of the user is maintained and only the user defined amount of data is received with regards to the historical interactions with the various IoT devices, support devices, and client devices. In one embodiment, historical user interactions include instances of a user performing a task at a specific location for which one or more client devices associated with the user collect data from various sensors. As previously discussed above, the various sensors can include an accelerometer, a gyroscope sensor, an orientation sensor, a pedometer, a heart rate sensor, and a blood pressure sensor. Historical user interactions also include instances of a user performing a task at a specific location for which one or more IoT device associated with the specific location collect data. The data for the one or more IoT devices can include temperature, pressure, moisture levels, video feeds, audio feeds, and any other environmental data or user associated data that can affect a hazardous condition at the specific location. Historical user interactions also include instances of a user performing a task at a specific location for which a support device associated with the task collects data while assisting the user. The data for the support device can include an action performed by the support device to assist the user (e.g., assist with lifting a heavy item), a degree to which an action was performed by the support device to assist the user (e.g., lifted an edge of the heavy item to level the load), and whether additional assistance from other support devices was required.

Support device deployment program 112 identifies the task for the historical data (204). Support device deployment program 112 can utilize the historical data from each of the IoT devices, support devices, and client devices to identify a task the task performed by the user. In one example, support device deployment program 112 receives a video feed from an IoT device directed towards a location where a user is performing a task and based on analysis of the motion of the user, determines the user is lifting multiple boxes from a pallet and moving them to a tabletop. Utilizing time stamps for the collected data, support device deployment program 112 associates the task captured in the video feed by the IoT device with collected data from the client device associated with the user and identifies a rapid heart rate increase for the user as the task is being performed. In another example, support device deployment program 112 receives historical data from a client device associated with the user, where the client device is a wearable watch on a wrist of the user. Based on a motion of the wearable watch, support device deployment program 112 determines the user is torquing a bolt and attempting to tighten the bolt to a set specification. Multiple jolts in the motion of the wearable watch indicate the user is having difficulty performing the task of reaching a proper torque for the bolt, possibility due to lack of strength or improper tool usage.

Support device deployment program 112 identifies instances of required assistance (206). Based on the identified task and the historical data collected from the various IoT devices, support devices, and client devices, support device deployment program 112 identifies instance of required assistance by the user to perform a task. In the example where support device deployment program 112 receives a video feed from an IoT device for a user lifting multiple boxes from a pallet and moving them to a tabletop, support device deployment program 112 identifies an instance of required assistance based on a rapid increase in a heart rate for the user as captured by a client device associated with the user. The rapid increase in the heart rate indicates the user is straining to lift the multiple boxes and assistance from a support device can alleviate the strain for the user (i.e., slow and/or eliminate the increase in the heart rate). In the example where support device deployment program 112 receives historical data from a wearable device as a user attempts to torque a bolt, support device deployment program 112 identifies an instance of required assistance due to the multiple jolts being experienced by the client device being outside of normal operating parameters. The multiple jolts, as captured by an accelerometer on the client device, indicate an abnormal condition for someone attempting to safely torque a bolt to proper specification.

Support device deployment program 112 identifies instances of hazardous conditions (208). A hazardous condition represents an instance of required assistance that exceeds a threshold level where a task can potentially cause harm to the user and/or others in vicinity of the user. In the example where support device deployment program 112 receives a video feed from an IoT device for a user lifting multiple boxes from a pallet and moving them to a tabletop, support device deployment program 112 identifies an instance of a hazardous condition due to the rapid increase of a heart rate for the user exceeding a threshold level. The user can experience a dangerous heart rate, resulting in a dangerous situation if the user were to continue unassisted. In the example where support device deployment program 112 receives historical data from a wearable device as a user attempts to torque a bolt, support device deployment program 112 identifies an instance of a hazardous condition due to the multiple jolts (i.e., accelerometer readings) exceeding a threshold level. The user can potentially hurt themselves (i.e., wrist) with the multiple jolts and/or potentially damage a tool being utilized to torque the bolt, where the damaging of the tool can result in a potentially hazardous condition to the user if the tool experiences a structural failure.

Support device deployment program 112 generates a knowledge corpus for the historical data, the various devices, and the task (210). Support device deployment program 112 generates a knowledge corpus that correlates the data generated by the various IoT devices, support devices, and client devices to the identified tasks, instances of required assistance, and instances of hazardous conditions. Support device deployment program 112 utilizes the knowledge corpus to identify future tasks being performed by a user and to identify subsequent instances of required assistance and instances of hazardous conditions. The knowledge corpus, also referred to as a text corpus, is a language resource that include a structured set of text, where the structured set of text includes the data generated by the various IoT devices, support devices, and client devices, correlated to the identified tasks, instances of required assistance, and instances of hazardous conditions.

Figure 3:
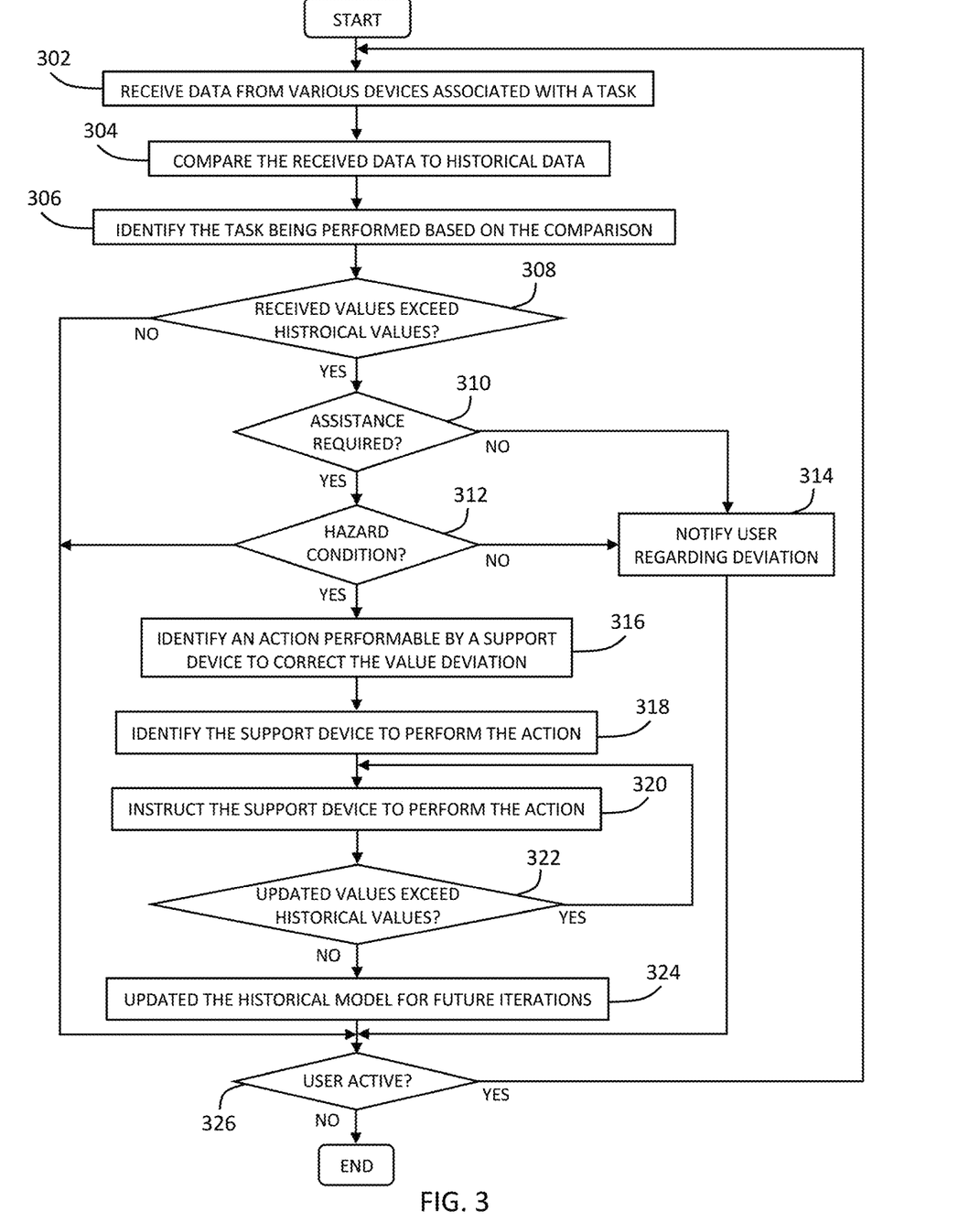
FIG. 3 depicts a flowchart for a support device deployment program instructing a support device to perform an action to assist personnel with a physical task, in accordance with an embodiment of the present invention.

FIG. 3 depicts a flowchart for a support device deployment program instructing a support device to perform an action to assist personnel with a physical task, in accordance with an embodiment of the present invention.

Support device deployment program 112 receives data from various devices associated with a task (302). In this embodiment, support device deployment program 112 receives data from multiple IoT device at a specific location (e.g., warehouse floor, manufacturing floor) and data from a client device associated with a user performing the task. In one example, support device deployment program 112 receives a video feed from an IoT device (e.g., security camera) of a user attempting to lift and relocate a heavy box from a tabletop to a pallet. Additionally, support device deployment program 112 receives heart rate values from a wearable device for the user attempting to lift and relocate the heavy box from the tabletop to the pallet. In another example, support device deployment program 112 receives data values from an accelerometer on a wearable device associated with a user performing a task of torquing a bolt. Additionally, support device deployment program 112 receives heart rate values from the wearable device for the user attempting to torque the bolt.

Support device deployment program 112 compares the received data to historical data (304). Support device deployment program 112 compares the receives data to historical data present in the previously established knowledge corpus previously discussed with regards to FIG. 2. Support device deployment program 112 identifies a type of data (e.g., accelerometer values, heart rate values) and a source for each type of data (e.g., security camera, wearable device). Based on the identified type of data and the identified source of data, support device deployment program 112 compares these received data for each type and each source to the historical data for each type and each source. Support device deployment program 112 identifies the task being performed based on the comparison (306). In this embodiment, support device deployment program 112 utilizes the knowledge corpus with the historical data correlated to various IoT devices, support devices, and client devices to identify the task being performed based on the comparison between each type and each source for the received data and each type and each source for the historical data. Support device deployment program 112 can utilize a comparison threshold to identify which historical data matches received data, thereby identifying current task being performed based on a previous task with the associated historical data. In an alternative embodiment, support device deployment program 112 utilizes image analysis on a video feed from an IoT device (e.g., security camera) to identify the task being performed by a user at a specific location.

Support device deployment program 112 determines whether the received values exceed historical values (decision 308). Subsequent to identifying the task being performed by the user at the specific location based on a comparison threshold between the historical data and the received data, support device deployment program 112 identifies all historical data associated with the task being performed by the user. Support device deployment program 112 compares all of the historical data associated with the task and determines with the received values exceed historical values for a task being performed in a nonhazardous manner. In the example where support device deployment program 112 receives heart rate data for a user attempting to lift and relocate a heavy box from a tabletop to a pallet, support device deployment program 112 compares the received heart rate data to historical heart rate data to determine if the received values exceed the historical values by a predetermined threshold. In another example where support device deployment program 112 receives accelerometer data values from wearable device of a user torquing a bolt, support device deployment program 112 compares the received accelerometer data values to historical accelerometer data values to determines if the received values exceed the historical values.

In the event support device deployment program 112 determines the received values do exceed historical values ("yes" branch, decision 308), support device deployment program 112 determines whether assistance is required by a support device (decision 310). In the event support device deployment program 112 determines the received values do not exceed historical values ("no branch, decision 308), support device deployment program 112 determines whether the user is still actively performing the task (decision 326).

Support device deployment program 112 determines whether assistance is required by a support device (decision 310). Support device deployment program 112 determines whether assistance is required by a support device based on the received values exceeding the historical values by a predetermined amount (e.g., 5%). In another embodiment, support device deployment program 112 determines whether assistance is required by a support device based on the received values deviating from the historical values by a predetermined amount (e.g., ±5%). In the event support device deployment program 112 determines assistance is required by support device ("yes" branch, decision 310), support device deployment program 112 determines whether a hazard condition is present (decision 312). In the event support device deployment program 112 determines assistance is not required by a support device ("no" branch, decision 310), support device deployment program 112 notifies the user regarding a deviation in the received values and the historical values (314).

Support device deployment program 112 determines whether a hazard condition is present (decision 312). Support device deployment program 112 determines whether a hazard condition exists based on the received values exceeding the historical values by an additional predetermined amount (e.g., 10%). In another embodiment, support device deployment program 112 determines whether a hazard condition exists based on the received values deviating from the historical values by an additional predetermined amount (e.g., ±10%). In yet another embodiment, support device deployment program 112 determines whether a hazard condition exists based on image analysis from one or more feeds from the IoT devices. For example, support device deployment program 112 can utilizes the previously received data of a video feed from an IoT device to identify a hazardous condition, such as, items stacked too tall, items tipping over, and an incorrect tool being utilized to torque a bolt. In the event support device deployment program 112 determines a hazard condition is not present ("no" branch decision 312), support device deployment program 112 notifies the user regarding a deviation in the received values and the historical values (314). In the event support device deployment program 112 determines a hazard condition is present ("yes" branch, decision 312), support device deployment program 112 identifies an action performable by a support device to correct the value deviation (316).

Support device deployment program 112 notifies the user regarding a deviation in the received values and the historical values (314). In the event the received values exceed the historical values, but the received values do not exceed the historical values by a predetermined amount (i.e., 0%<x<5%), support device deployment program 112 notifies the user regarding the deviation. The notification is to alert the user regarding the deviation and to perform corrective action to avoid a support device being deployed to assist with the task. In the example where support device deployment program 112 determines a user is experiencing an increased heart rate due to the lifting of a heavy item, support device deployment program 112 sends a notification to a wearable device associated with the user, where the notification indicates the elevated heart rate due to the task of lifting an item. Since the user is more than likely utilizing both hands to lift the heavy item, support device deployment program 112 notifies the user via a distinct vibration pattern on the wearable device (e.g., a pattern imitating the increased heart rate, rapid pulsation). The notification allows for the user to take action by placing the heavy item down, to avoid any further growth in the increased heart rate. In the example where support device deployment program 112 determines user is experiencing multiple jolts, as captured by an accelerometer on a wearable device associated with the user, support device deployment program 112 sends a notification to the wearable device indicating the multiple jolts can be a result of improperly following procedure for the task of torquing the bolt. Support device deployment program 112 notifies the user via a distinct vibration pattern and displays a step-by-step procedure for properly torquing the bolt. The user can view the notification and perform a corrective action of properly torquing the bolt, prior to the received values exceeding the historical values by the predetermined amount.

Support device deployment program 112 identifies an action performable by a support device to correct the value deviation (316). Support device deployment program 112 utilizes a knowledge corpus and one or more video feeds from the IoT devices to identify an action performable by a support device to correct the value deviation, such that the received values are no longer above a predetermined amount compared to the historical values. Support device deployment program 112 can utilizes the knowledge corpus to identify one or more previously performed actions by a support device to identify an action to correct the current value deviation. Additionally, support device deployment program 112 can perform image analysis on a video view from an IoT device to analyze a hazardous condition and to identify a performable action by a support device to correct the action. In a previously discussed example where support device deployment program 112 determines a user attempting to lift and relocate a heavy box from a tabletop to a pallet, support device deployment program 112 identifies an action performable by support device based on a previously performed actions by a support device. The action can include a deployment of a height adjustable robotic platform to assist the user with transferring the heavy box from the tabletop to the pallet. Alternatively, support device deployment program 112 receives a video feed from an IoT device (e.g., security camera) and identifies the user requires assistance to transfer the heavy box from the tabletop to the pallet. Support device deployment program 112 identifies a height adjustable robotic platform with rollers to assist the use with transferring the heavy box from the tabletop to the pallet. In another previously discussed example, support device deployment program 112 determines a user is attempting to torque a bolt and based on a video feed from an IoT device, support device deployment program 112 determines the user is utilizing a digital torque wrench with an incorrect length. Support device deployment program 112 identifies an action of disabling (i.e., deactivating) the digital torque wrench with the incorrect length and activating another digital torque wrench with the correct length, to perform the torquing procedure.

Support device deployment program 112 identifies the support device to perform the action (318). Based on a specific location of a user, support device deployment program 112 identifies any available support device to perform the action to assist the user with the identified task. Based on the identified available support devices, support device deployment program 112 identifies a portion of the available support devices capable of performing the action to assist the user with the task posing a hazardous condition, where the portion of the available support device can perform the action within any physical boundaries and/or rule-based parameters for the specific location. In a previously discussed example where support device deployment program 112 determines a user attempting to lift and relocate a heavy box from a tabletop to a pallet, support device deployment program 112 identifies available support devices in a vicinity of the user. Subsequent to identifying the available support devices in the vicinity of the user, support device deployment program 112 identifies a single support device from the available support device capable of performing the identifies action. The single support device is a height adjustable robotic platform capable of relocating to a location of the user to assist with the movement of the heavy box from the tabletop to the pallet. In another previously discussed example, support device deployment program 112 determines a user is attempting to torque a bolt with a digital torque wrench with an incorrect length and operational range. Support device deployment program 112 identifies available support device in a vicinity of the user and identifies a single support device from the available support device to perform the action. The single support device is a digital torque wrench with a larger length and greater operational range compared to the current digital torque wrench being utilized by the user.

Support device deployment program 112 instructs the support device to perform the action (320). In one embodiment, support device deployment program 112 instructs the support device to perform the action by relocating to a location of the user and reconfiguring based on a type of hazardous condition. In a previously discussed example where support device deployment program 112 identified a height adjustable robotic platform for performing an action to assist a user with the task of relocating a heavy box from a tabletop to a pallet, support device deployment program 112 instructs the height adjustable robotic platform to relocate to a location of the user and to adjust (i.e., reconfigure) a loading surface of the height adjustable robotic platform to a height equivalent to a height of the tabletop. In another previously discussed example where support device deployment program 112 identified a digital torque wrench with a larger length and greater operational range for performing an action to assist a user with the task of torquing a bolt to specification, support device deployment program 112 disables the current torque wrench with the incorrect length and operational range. Support device deployment program 112 disables the device by powering down the display and unlocking the ratcheting mechanism for applying a torque. Support device deployment program 112 activates (i.e., powers on) the digital torque wrench with the larger length and the greater operational range by setting the required torque specification for the bolt and activating a visual indicator (e.g., flashing green display) so the user can identify the correct tool to use to perform the torquing of the bolt. By disabling the current torque wrench and activating the new torque wrench, support device deployment program 112 receives future data values for the new torque wrench for the task rather than disabled torque wrench. In another embodiment, support device deployment program 112 previously identified a user is attempting to move a pallet with a manual pallet jack but is having difficult moving the pallet due to the weight on the pallet. Support device deployment program 112 identified an electrically assisted pallet jack as a support device for assisting the user and instructs the electrically assisted pallet jack to perform an initialization process to reduce down time as the user transitions between the manual pallet jack and the electrically assisted pallet jack.

Support device deployment program 112 determines whether updated values exceed historical values (decision 322). Support device deployment program 112 receives updated values from the various IoT devices, support devices, and client device, subsequent to instructing the support device to perform an action to assist the user with performing a task. In the event support device deployment program 112 determines the updated values do not exceed historical values ("yes" branch, decision 322), support device deployment program 112 updates the historical model for future iterations (324). Support device deployment program 112 updates the historical model for future iterations by updating the knowledge corpus with a correlation between the data received by the various IoT devices, support devices, and client devices to the identified task in (306), instance of required assistance in (308), instance of a hazardous condition in (312), and an action performed by a support device in (320). In the event support device deployment program 112 determines the updated values exceed historical values ("yes" branch, decision 322), support device deployment program 112 reverts to instructing the support device to perform the action (320).

Support device deployment program 112 determines whether the user is still actively performing the task (decision 326). In the event support device deployment program 112 determines the user is still actively performing the task ("yes" branch, decision 326), support device deployment program 112 reverts to receiving data from various devices associated with the task (302). In the event support device deployment program 112 determines the user is no longer actively performing the task ("no" branch, decision 326), support device deployment program 112 ceases operations.

Embodiments of the present invention can analyze data to identify user error and/or an instance of an assistance requirement in an activity being performed by personnel (i.e., user) and can identify instances for assisting the personnel utilizing a support device. The data can include visual and non-visual camera feed (e.g., infrared camera, radar, LiDAR) for activity analysis, as well as IoT device and wearable device feeds from personnel and historically how an error occurs while a user performs the activity. Based on the received data, embodiments of the present invention can create a visual three-dimensional model of the activity, such as, how the personnel perform the activity. For example, how the personnel carry heavy material, how is the material stacked, and if the staking of the material is approaching a dangerous incline (i.e., tipping point). Embodiments of the present invention can perform a visual simulation of the activity with the norms of performing the activity. From the previous example, the visual simulation can include instances of how the stank should not buckle under load or should not be shaking while being lifted by personnel. Embodiments of the present invention can identify historical mistakes and hazardous conditions and can utilizes the historical mistakes and hazardous conditions for future situational analysis. Embodiments of the present invention analyze wearable and IoT feeds to identify if personnel carrying more load, to identify biometric parameters (e.g., heart rate) based on the above analysis, and compare the feed and biometric parameters to the norm. Embodiments of the present invention can identify specific personnel requiring assistance based on the comparison. Based on the types of the activity (e.g., material movement, metal cutting), types of assistance required by specific personnel performing the activity, and types of mistake/hazardous condition while performing the activity, embodiments of the present invention identify appropriate support devices and instruct the support devices to assist the personnel. As the support devices provides assistance to personnel, embodiments of the present invention continuously evaluate the activity and provide additional assistance from additional support devices.

Embodiments of present invention can capture the activities being manually performed by personnel and/or partially being performed by personnel with various non-visual scanning and with IoT feed analysis. Embodiments of the present invention can identify how the personnel are performing the activities and considering the way of performing the activity, can create a three-dimensional model of the activity. Embodiments of the present invention can classify the activities based on the mistake or hazardous condition associated with the activity, as well as, how to successfully perform the activity without incident. The mistake or hazardous condition in the activity can be identified based on analysis of the KPIs (e.g., damage, vibration, instability, longer time to perform activity). Embodiments of the present invention can consider pre-defined norms to identify instances of mistakes or hazardous conditions. The data is captured and a knowledge corpus is created for how the activity should be performed by personnel in a safe manner. The knowledge corpus is updated based on any improvement in the activity and if the activity is being performed in wrong or improper manner in subsequent activities. Embodiments of the present invention can analyze the activity specific information and instruct a support device to perform a specific action to assist the personnel.

Embodiments of present invention can also utilize an Artificial Intelligence (AI) based system to analyze the how personnel perform any activity If a mistake is identified in the activity being performed, embodiments of present invention instruct a support device to collaborate with the worker to perform the activity in a more appropriate and safer manner. The personnel and support device collaboration can occur in any industrial setting with different physical activities assigned to personnel and specific physical activates assigned to support device to assist the personnel. If the AI system predicts specific personnel are not able to perform the activity properly and/or a mistake resulting in a hazardous condition has occurred, embodiments of the present invention can predict and provide support to the specific personnel performing the activity.

Figure 4:
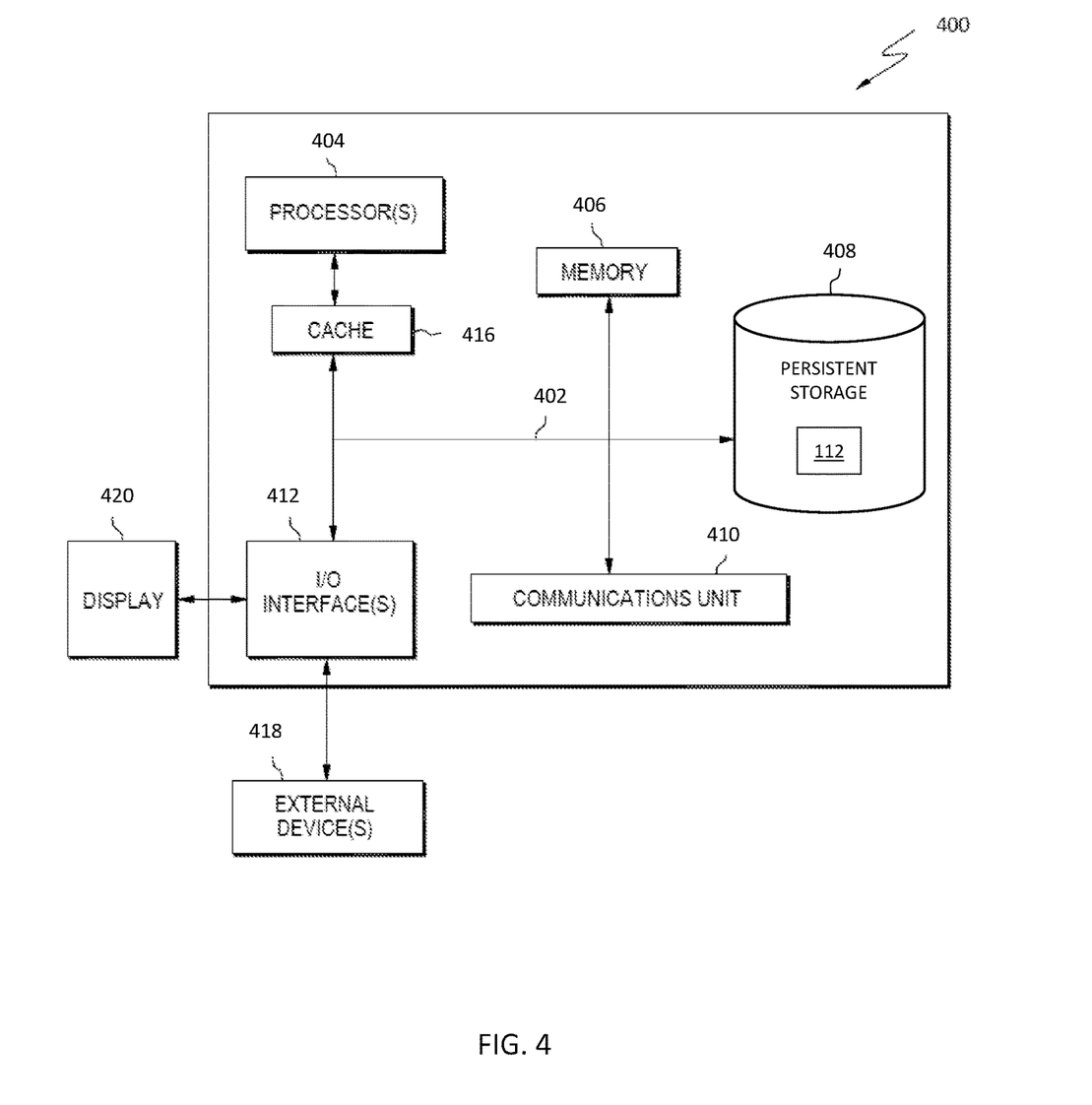
FIG. 4 is a block diagram of components of a computer system, such as the server computer of FIG. 1, in accordance with an embodiment of the present invention.

FIG. 4 depicts computer system 400, where server computer 102 is an example of a computer system 400 that includes support device deployment program 112. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
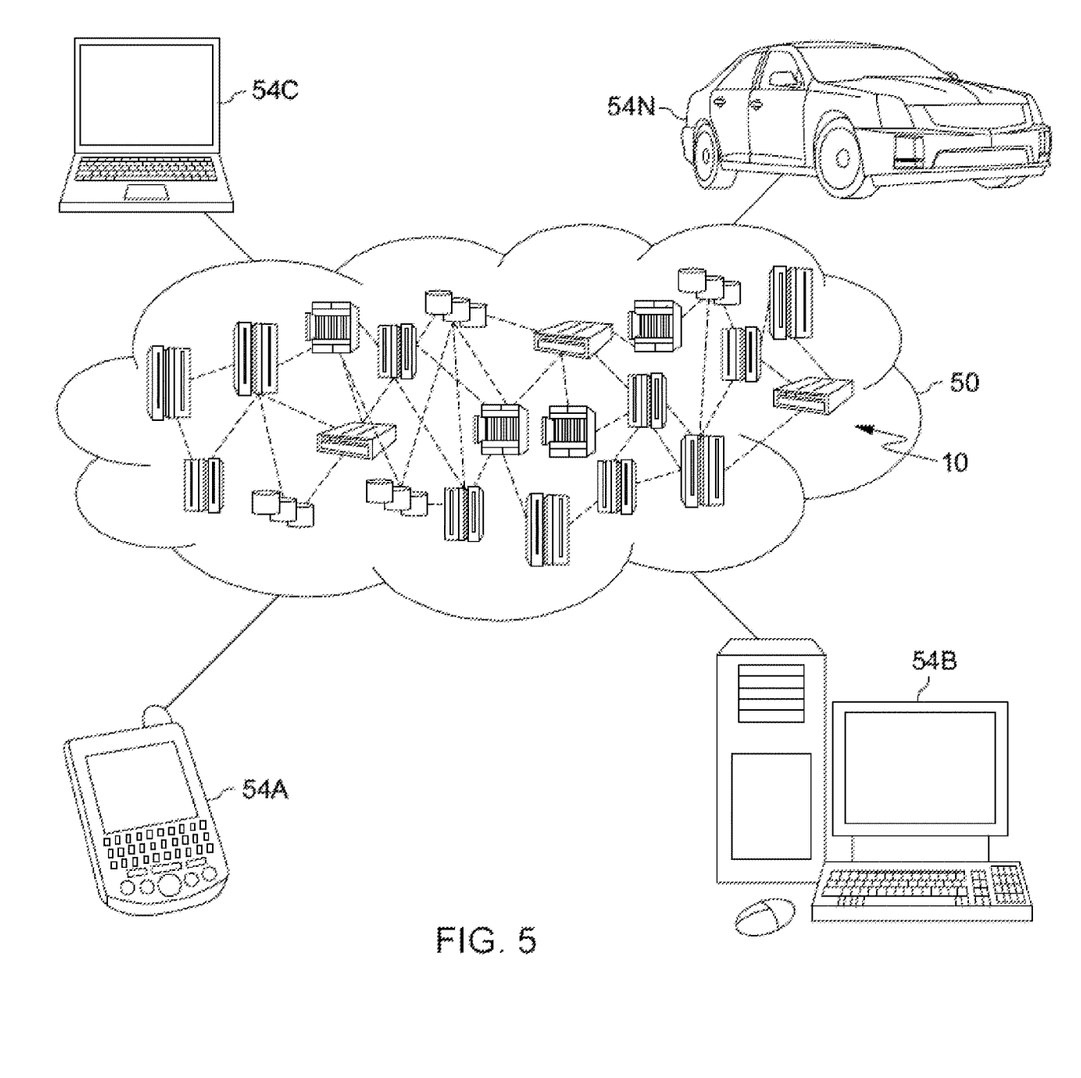
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
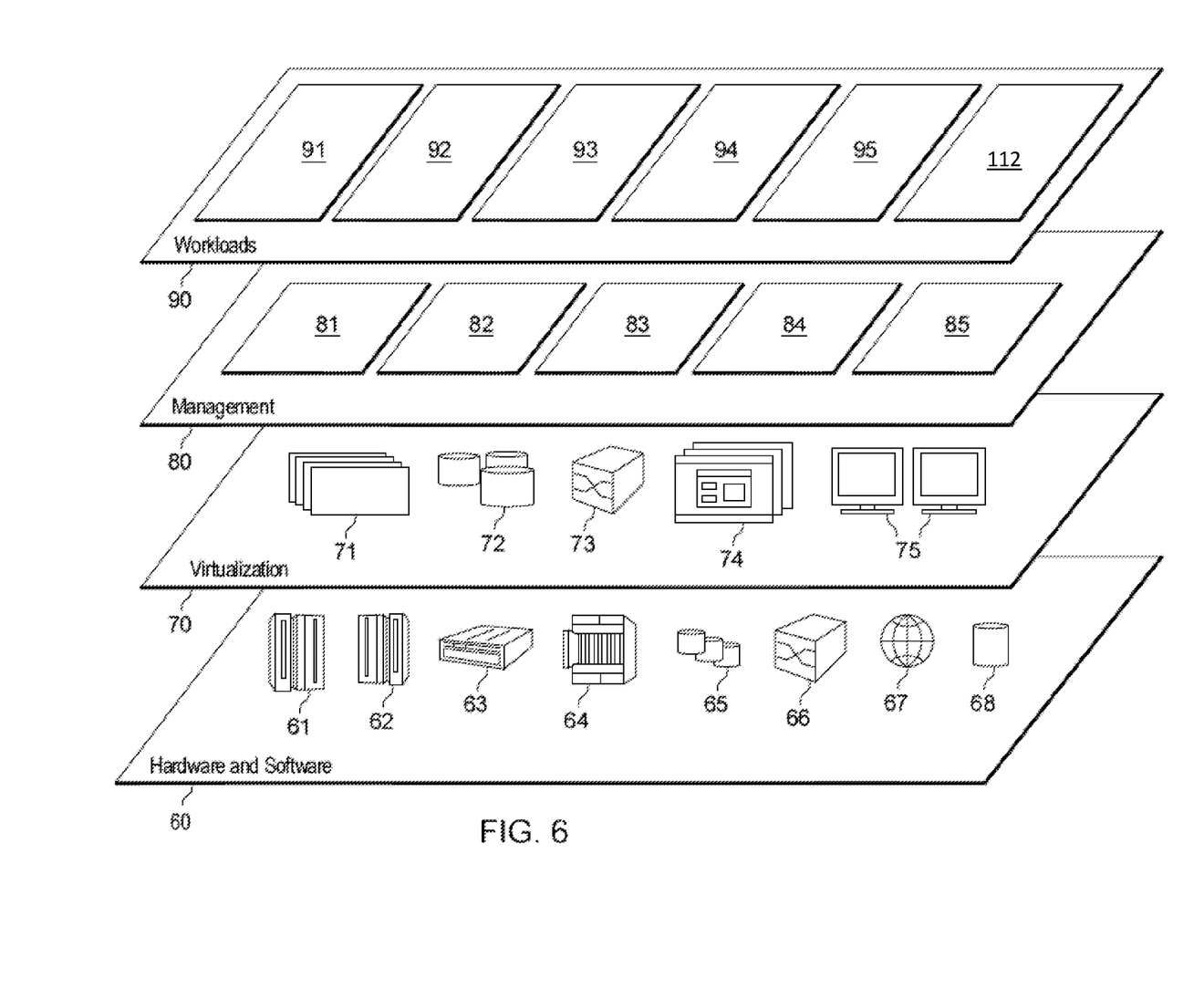
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and support device deployment program 112.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    receiving data values from various devices associated with a task being performed by personnel, wherein the various devices include at least one Internet of Things (IoT) device and at least one wearable device;
    comparing the received data values to historical data values associated with a pre-established knowledge corpus;
    identifying, based on the comparing, the task being performed by the personnel;
    determining the received values exceed the historical values by a predetermined threshold for the task being performed by the personnel;
    determining the personnel requires assistance with performing the task based on the predetermined threshold being exceeded;
    relocating a support device to a location of the personnel;
    reconfiguring, based on a type of hazardous condition associated with the task being performed by the personnel, the support device to assist the personnel with performing the task; and
    performing, via the support device, an action to assist the personnel with performing the task.

2. The computer-implemented method of claim 1, further comprising:
    identifying the action performable by the support device to correct a value deviation between the received values and the historical values;
    identifying a plurality of available support devices within a vicinity of the personnel; and
    identifying the support device from the plurality of available support devices to perform the action to assist the personnel with performing the task.

3. The computer-implemented method of claim 2, wherein identifying the action performable by the support device further comprises:
    analyzing a data feed from the at least one IoT device;
    identifying, based on the analyzing of the data feed, a type of hazardous condition associated with the task being performed by the personnel; and
    identifying the action performable by the support device, wherein the knowledge corpus includes a previous action performed by another support device for correcting the type of hazardous condition associated with the task being performed by the personnel.

4. The computer-implemented method of claim 3, wherein performing, via the support device, the action to assist the personnel with performing the task further comprises:
    deactivating a first electronic tool being utilized by the personnel to perform the task; and
    activating, based on the type of hazardous condition, a second electronic tool for performing the task.

5. The computer-implemented method of claim 2, further comprising:
    determining the received values exceed the historical values by an additional predetermined threshold for the task being performed by the personnel; and
    determining a hazardous condition exists with the task being performed by the personnel.

6. The computer-implemented method of claim 2, further comprising:
    determining the received values do not exceed the historical values by an additional predetermined threshold for the task being performed by the personnel; and
    notifying, via the at least one wearable device, the personnel regarding the deviation between the received values and the historical values.

7. A computer program product comprising:
    one or more computer-readable storage media and program instructions stored on the one or more computer-readable storage media capable of performing a method, the method comprising:
    receiving data values from various devices associated with a task being performed by personnel, wherein the various devices include at least one Internet of Things (IoT) device and at least one wearable device;
    comparing the received data values to historical data values associated with a pre-established knowledge corpus;
    identifying, based on the comparing, the task being performed by the personnel;
    determining the received values exceed the historical values by a predetermined threshold for the task being performed by the personnel;
    determining the personnel requires assistance with performing the task based on the predetermined threshold being exceeded;
    relocating a support device to a location of the personnel;
    reconfiguring, based on a type of hazardous condition associated with the task being performed by the personnel, the support device to assist the personnel with performing the task; and
    performing, via the support device, an action to assist the personnel with performing the task.

8. The computer program product of claim 7, further comprising:
    identifying the action performable by the support device to correct a value deviation between the received values and the historical values;
    identifying a plurality of available support devices within a vicinity of the personnel; and
    identifying the support device from the plurality of available support devices to perform the action to assist the personnel with performing the task.

9. The computer program product of claim 8, wherein identifying the action performable by the support device further comprises:
    analyzing a data feed from the at least one IoT device;
    identifying, based on the analyzing of the data feed, a type of hazardous condition associated with the task being performed by the personnel; and
    identifying the action performable by the support device, wherein the knowledge corpus includes a previous action performed by another support device for correcting the type of hazardous condition associated with the task being performed by the personnel.

10. The computer program product of claim 9, wherein performing, via the support device, the action to assist the personnel with performing the task further comprises:
    deactivating a first electronic tool being utilized by the personnel to perform the task; and
    activating, based on the type of hazardous condition, a second electronic tool for performing the task.

11. The computer program product of claim 8, further comprising:
    determining the received values exceed the historical values by an additional predetermined threshold for the task being performed by the personnel; and
    determining a hazardous condition exists with the task being performed by the personnel.

12. The computer program product of claim 8, further comprising:
- determining the received values do not exceed the historical values by an additional predetermined threshold for the task being performed by the personnel; and
- notifying, via the at least one wearable device, the personnel regarding the deviation between the received values and the historical values.

13. A computer system comprising:
- one or more computer-readable storage media and program instructions stored on the one or more computer-readable storage media capable of performing a method, the method comprising:
- receiving data values from various devices associated with a task being performed by personnel, wherein the various devices include at least one Internet of Things (IoT) device and at least one wearable device;
- comparing the received data values to historical data values associated with a pre-established knowledge corpus;
- identifying, based on the comparing, the task being performed by the personnel;
- determining the received values exceed the historical values by a predetermined threshold for the task being performed by the personnel;
- determining the personnel requires assistance with performing the task based on the predetermined threshold being exceeded;
- relocating a support device to a location of the personnel;
- reconfiguring, based on a type of hazardous condition associated with the task being performed by the personnel, the support device to assist the personnel with performing the task; and
- performing, via the support device, an action to assist the personnel with performing the task.

14. The computer system of claim 13, further comprising:
- identifying the action performable by the support device to correct a value deviation between the received values and the historical values;
- identifying a plurality of available support devices within a vicinity of the personnel; and
- identifying the support device from the plurality of available support devices to perform the action to assist the personnel with performing the task.

15. The computer system of claim 14, wherein identifying the action performable by the support device further comprises:
- analyzing a data feed from the at least one IoT device;
- identifying, based on the analyzing of the data feed, a type of hazardous condition associated with the task being performed by the personnel; and
- identifying the action performable by the support device, wherein the knowledge corpus includes a previous action performed by another support device for correcting the type of hazardous condition associated with the task being performed by the personnel.

16. The computer system of claim 15, wherein performing, via the support device, the action to assist the personnel with performing the task further comprises:
- deactivating a first electronic tool being utilized by the personnel to perform the task; and
- activating, based on the type of hazardous condition, a second electronic tool for performing the task.

17. The computer system of claim 14, further comprising:
- determining the received values exceed the historical values by an additional predetermined threshold for the task being performed by the personnel; and
- determining a hazardous condition exists with the task being performed by the personnel.

18. The computer system of claim 14, further comprising:
- determining the received values do not exceed the historical values by an additional predetermined threshold for the task being performed by the personnel; and
- notifying, via the at least one wearable device, the personnel regarding the deviation between the received values and the historical values.

* * * * *